June 16, 1931.  K. F. GALLIMORE  1,810,166
ADJUSTABLE GAUGE
Filed July 5, 1923
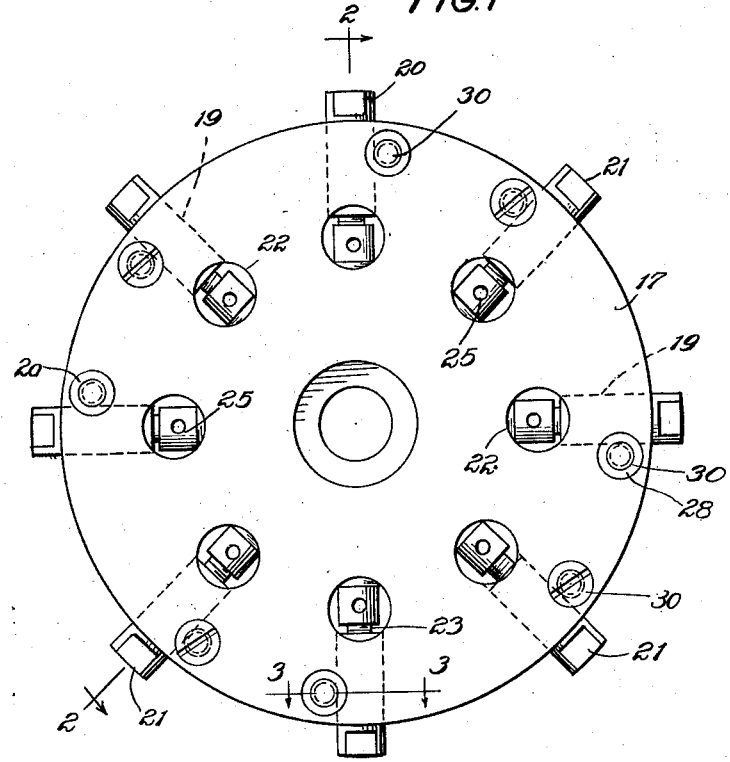
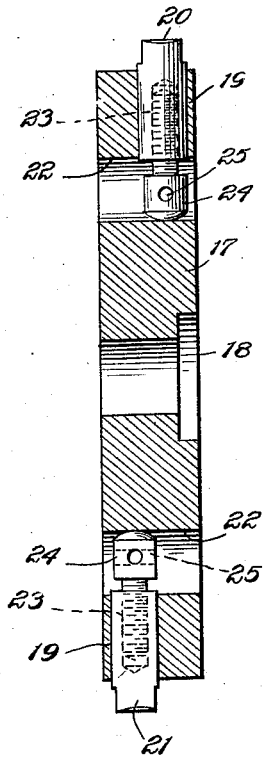
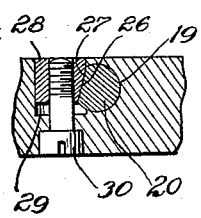
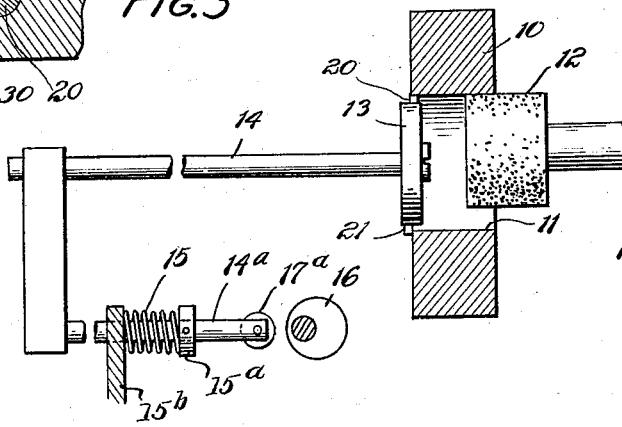
Inventor
Keith F. Gallimore Patented June 16, 1931

1,810,166

UNITED STATES PATENT OFFICE

KEITH F. GALLIMORE, OF FOND DU LAC, WISCONSIN, ASSIGNOR, BY MESNE ASSIGNMENTS, TO THE HEALD MACHINE COMPANY, OF WORCESTER, MASSACHUSETTS, A CORPORATION OF MASSACHUSETTS

ADJUSTABLE GAUGE

Application filed July 5, 1923. Serial No. 649,410.

The invention relates to an adjustable gauge for indicating the completion of a metal removing operation, and more particularly to a roughing and finishing gauge adapted for use in grinding machines to indicate the completion of the grinding operation.

The gauge is particularly adapted for use in internal grinding machines such as the one described in Patent No. 1,534,302 granted April 21, 1925 to Prentice Conradson et al., in which machine a grinding element is reciprocated through the bore of a revolving work piece, and in which a gauge device periodically and automatically attempts to enter the bore after each withdrawal of the grinding element.

The gauge comprises two sets of gauge pins defining two different diameters or dimensions, and when the work has been ground to a predetermined point, the first set enters the bore and effects a decrease in the rate of relative cross feed between the work and the grinding element. After continuing the grinding operation at the new rate, the second set of gauge pins finally enters the work and actuates a suitable means for discontinuing the cross feed.

Heretofore the gauge pins have been mounted rigidly in the supporting body, and it has therefore been necessary to supply a separate gauge device for each diameter of bore to be ground. It has also been necessary to provide a separate gauge device for each interval of time during which it is desired to have the fine feed operative.

The primary object of the invention is to provide a gauge device of the above character which can be adjusted for use with different diameters, and which can also be adjusted to vary the interval of time during which the fine feed is operative.

Further objects and advantages will become apparent as the description proceeds.

In the accompanying drawings Fig. 1 is a front view of a gauge device embodying the features of my invention. Fig. 2 is a section taken along line 2—2 of Fig. 1. Fig. 3 is a fragmentary section taken along line 3—3 of Fig. 1. Fig. 4 is a diagrammatic view showing the gauge device in its relation to a piece of work being ground.

In the exemplary embodiment of my invention illustrated in the drawings, 10 represents a rotatable work piece having a bore 11 which is being ground by a reciprocating grinding element 12, and 13 indicates a gauge device preferably mounted upon a rod 14 for reciprocation toward and from the work piece 10. I have herein shown a coil spring 15 wound around a rod $14^a$ for forcing the gauge device 13 toward and against the work, and a revolving cam 16 engaging a roller $17^a$ supported by the rod $14^a$, for regularly and periodically moving the gauge device out of engagement with the work. The spring 15 abuts at its forward end against a stop $15^a$ on the rod $14^a$, and at its other end against a fixed stop $15^b$. Any suitable means (not shown) may be employed to actuate the cam 16 in synchronism with the reciprocation of the grinding element 12.

The gauge device 13 comprises a body or circular disk 17 which is provided with a central bore 18 for attachment to the free end of the rod 14. While I have shown the body 17 as being circular, any other suitable form may be employed.

A plurality of radial bores or guideways 19 extend inwardly from opposite ends of the peripheral surface of the disk 17 for approximately one-half of the radius, and within the bores adjacent the front edge are positioned a plurality of coarse feed gauge pins 20. The bores in the opposite or rear side of the disk 17 slidably house a plurality of fine feed gauge pins 21. Although the gauge pins may be positioned about the periphery in any convenient manner, I have herein shown them as being equally spaced. I have also shown four coarse feed gauge pins and four fine feed gauge pins, but any other suitable number may be employed. The outer ends of the gauge pins are curved, preferably in the form of an arc about the axis of the disk 17.

The gauge pins 21 extend outwardly a greater distance from the periphery of the disk 17 than do the pins 20, and the latter are the first to enter the bore 11 after the grinding operation has proceeded to a predetermined point. The pins 21 upon the reciprocation of the rod 14 strike the front face of the work and prevent a complete entrance of the disk 17 into the bore 11 until the grinding operation has been exactly completed.

Automatic gauges of the above character commonly are used to control the relative cross feed between the work 10 and the grinding wheel 12. Preferably this cross feed is graduated, the initial movement being relatively fast to produce a coarse or rough cut, and the final movement being relatively slow to produce a fine or finish cut. The means for effecting a cross feed of this character is not disclosed herein since it forms no part of the present invention and since a suitable type thereof is fully disclosed in the above mentioned patent. Since the gauge pins 20 enter the bore of the work first to discontinue the coarse feed, and the pins 21 enter said bore subsequently to discontinue the fine feed, they are appropriately designated as the coarse or roughing gauge pins and the fine or finishing gauge pins respectively. While I have described the gauge member as controlling a graduated cross feed, it is to be understood that it may be used for any other purposes to which it can be adapted, without departing from the spirit and scope of the invention.

Means is provided for individually adjusting the radial position of each gauge pin. A plurality of equally spaced holes 22 extend through the disk 17 at equal distances from its axis, and through the inner ends of the bores 19. An adjusting screw 23 formed with a rounded head 24, having intersecting apertures 25 whereby it may be turned, is positioned in each hole 22 and is centrally threaded into the adjacent gauge pin for adjusting the latter.

Each gauge pin is cut away at one side for a portion of its length to provide a flat surface 26 which engages with the flat wedge surface 27 of a locking nut 28. The locking nut 28 is slidably mounted in a countersunk bore 29 extending partially through the disk 17 near its periphery and next to the bore 19. A screw 30 extends through the disk 17 from the opposite side, and is threaded into the nut 28 for adjusting the latter. In the present instance, the locking nuts 28 and screws 30 for the gauge pins 21 and for the gauge pins 20 are located in opposite sides of the disk 17.

It will be seen that by turning the screw 23, each gauge pin can be independently adjusted, and that by tightening the screw 30, the wedge nut 28 will clamp the gauge pin tightly in its adjusted position and against rotation about its axis. The gauge device 13, by properly adjusting the gauge pins 20 and 21, can therefore be adapted for use in grinding bores of different diameters. By adjusting only the pins 21 or the pins 20, the interval during which the fine feed is operative can be varied. I have herein shown a gauge device which is particularly adapted for use with an internal grinder, but it can readily be adapted by slight modifications for use in other types of grinders and for other types of work.

While I have herein disclosed the preferred embodiment of my invention, it is to be understood that various modifications and alternative constructions may be made without departing from the spirit and scope of the invention as expressed in the appended claims.

I claim as my invention:

1. A gauge device comprising a body having a radial bore, a gauge pin slidably mounted in said bore, there being a transverse bore extending through said body and said radial bore, an adjusting screw in said transverse bore having threaded engagement with said pin, and means for clamping said pin in position.

2. A gauge device comprising a flat circular disk having a plurality of radial bores extending in from the periphery of said disk and a plurality of transverse bores one at the inner end of each first mentioned bore, a plurality of gauge pins one mounted in each first mentioned bore, a plurality of adjusting screws one in each second mentioned bore for individually adjusting said pins radially, and means for individually clamping said gauge pins in their adjusted positions.

3. A gauge device comprising a cylindrical body having a plurality of bores extending inwardly from the periphery of said body and a plurality of transverse bores one at the inner end of each first mentioned bore, a plurality of gauge pins one mounted in and projecting out from each first mentioned bore, a plurality of adjusting members one in each second mentioned bore for individually adjusting said gauge pins longitudinally, and means for clamping said gauge pins in their adjusted positions.

4. A gauge device comprising a flat circular disk having a plurality of radial bores extending inwardly from the periphery of said disk, said bores being arranged in two sets located in two closely spaced planes respectively at opposite ends of said disk, a plurality of gauge pins one slidably mounted in each bore and projecting outwardly from the periphery of said disk, means for individually adjusting said pins radially, and means for individually clamping said pins in their adjusted positions.

5. A gauge device comprising a body having a plurality of bores extending inwardly from the periphery of said body, said bores being arranged in two sets located respectively in two closely spaced parallel planes and the bores of said planes being arranged in staggered relation in the periphery of said body, a plurality of gauge members one slidably mounted in each of said bores and projecting outwardly from the periphery of said body, means for adjusting said members longitudinally in said bores, and means for clamping said members in their adjusted positions.

6. A gauge device comprising a narrow body having a plurality of guideways extending inwardly from the periphery of said body and being arranged in two sets located respectively in two closely spaced parallel transverse planes, a plurality of gauge members one slidably mounted in each guideway and projecting outwardly from the periphery of said body, means for adjusting said members longitudinally in said guideways, and means for clamping said members in their adjusted positions.

7. A gauge device comprising a narrow body having a plurality of guideways extending inwardly from the periphery of said body, a plurality of gauge members one slidably mounted in each of said guideways and projecting outwardly from the periphery of said body, a plurality of adjusting members one at the inner end of each guideway for individually adjusting the gauge member therein, and means for clamping said gauge members in their adjusted positions.

8. In appartus of the class described, a flat member, a set of gauge members projecting from the edge of said flat member and located close to one side face thereof, a set of gauge members projecting from the edge of said flat member and located close to the other side face thereof, and adjustment means for each gauge member whereby the two sets of gauge members may be adjusted to successively caliper an opening in a workpiece by the first set and then by the second set of gauge members, the member requiring limited motion to introduce the first set of gauge members and but little more motion to introduce the second set of gauge members.

In testimony whereof, I have hereunto affixed my signature.

KEITH F. GALLIMORE.